United States Patent
Hu

(12) 
(10) Patent No.: US 10,335,900 B2
(45) Date of Patent: Jul. 2, 2019

(54) PROTECTIVE SHIELD FOR LIQUID GUIDED LASER CUTTING TOOLS

(71) Applicant: General Electric Company, Schenectady, NY (US)

(72) Inventor: Zhaoli Hu, Greer, SC (US)

(73) Assignee: General Electric Company, Schenectady, NY (US)

(*) Notice: Subject to any disclaimer, the term of this patent is extended or adjusted under 35 U.S.C. 154(b) by 542 days.

(21) Appl. No.: 15/059,721

(22) Filed: Mar. 3, 2016

(65) Prior Publication Data
US 2017/0252866 A1    Sep. 7, 2017

(51) Int. Cl.
| B23K 26/00 | (2014.01) |
| B23K 26/14 | (2014.01) |
| B23K 26/146 | (2014.01) |
| B23K 26/382 | (2014.01) |
| B23K 26/38 | (2014.01) |

(52) U.S. Cl.
CPC ........ B23K 26/1488 (2013.01); B23K 26/146 (2015.10); B23K 26/38 (2013.01); B23K 26/389 (2015.10)

(58) Field of Classification Search
CPC .. B23K 26/1488; B23K 26/46; B23K 26/389; B23K 26/38; H05H 1/26; H05H 1/34
USPC .............. 219/121.51, 121.5, 121.48, 121.71, 219/121.391, 21.45
See application file for complete search history.

(56) References Cited

U.S. PATENT DOCUMENTS

| 799,256 A | 9/1905 | Parker |
| 2,659,198 A | 11/1953 | Cook |
| 3,004,494 A | 10/1961 | Corbett |
| 3,733,816 A | 5/1973 | Grennan et al. |
| 3,851,998 A | 12/1974 | Downing |
| 4,121,085 A | 10/1978 | Diemer et al. |
| 4,159,623 A | 7/1979 | McReynolds |
| 4,807,433 A | 2/1989 | Maclin et al. |
| 5,051,065 A | 9/1991 | Ansen |
| 5,235,812 A | 8/1993 | Klaass et al. |
| 5,279,109 A | 1/1994 | Liu et al. |
| 5,716,423 A | 2/1998 | Krul et al. |
| 5,820,589 A | 10/1998 | Torgerson et al. |
| 5,902,499 A | 5/1999 | Richerzhagen |
| 6,021,979 A | 2/2000 | Bender et al. |
| 6,022,197 A | 2/2000 | Cygnor et al. |

(Continued)

FOREIGN PATENT DOCUMENTS

| CA | 2330426 A1 | 11/1999 |
| EP | 0391288 B1 | 5/1994 |

(Continued)

*Primary Examiner* — Mark H Paschall
(74) *Attorney, Agent, or Firm* — Dale Davis Hoffman Warnick LLC

(57) ABSTRACT

This disclosure provides a shield for use in a liquid guided laser system and related method of use. The shield comprises a rigid body with a target facing surface. The rigid body defines a through hole with a diameter that accommodates a liquid guided laser path. The rigid body has a thickness that defines a length of the liquid guided laser path through the rigid body. The thickness of the rigid body is at least twice the diameter of the through hole. The rigid body is positioned in the liquid guided laser path of the liquid guided laser system between a discharge nozzle of the liquid guided laser system and a target.

12 Claims, 4 Drawing Sheets

(56) References Cited

U.S. PATENT DOCUMENTS

| | | |
|---|---|---|
| 6,050,079 A | 4/2000 | Durgin et al. |
| 6,118,097 A | 9/2000 | Kaga et al. |
| 6,226,977 B1 | 5/2001 | Ichiryu et al. |
| 6,390,733 B1 | 5/2002 | Burbage et al. |
| 6,438,961 B2 | 8/2002 | Tuthill et al. |
| 6,471,675 B1 | 10/2002 | Rogers |
| 6,545,247 B2 | 4/2003 | Mukasa et al. |
| 6,589,205 B1 | 7/2003 | Meadows |
| 6,595,098 B1 | 7/2003 | Wray |
| 6,622,475 B2 | 9/2003 | Brault et al. |
| 6,979,315 B2 | 12/2005 | Rogers et al. |
| 7,698,894 B2 | 4/2010 | Wood et al. |
| 7,705,266 B2 | 4/2010 | Koseki et al. |
| 7,823,389 B2 | 11/2010 | Seltzer et al. |
| 7,876,224 B2 | 1/2011 | Prokopuk |
| 8,134,098 B2 | 3/2012 | Vluratsubaki et al. |
| 8,145,403 B2 | 3/2012 | Fuller et al. |
| 8,267,863 B2 | 9/2012 | Najafi et al. |
| 8,281,601 B2 | 10/2012 | McMahan et al. |
| 8,307,662 B2 | 11/2012 | Turco |
| 8,322,346 B2 | 12/2012 | Najafi et al. |
| 8,549,864 B2 | 10/2013 | Langdon, II et al. |
| 8,549,894 B2 | 10/2013 | Hoogerwerf |
| 8,596,035 B2 | 12/2013 | Mowill |
| 8,684,660 B2 | 4/2014 | Miranda et al. |
| 8,859,988 B1 * | 10/2014 | Gaebelein ............ B23K 26/146 219/121.84 |
| 8,946,588 B2 | 2/2015 | Suruceanu et al. |
| 8,969,760 B2 | 3/2015 | Hu et al. |
| 9,028,206 B2 | 5/2015 | Liotta et al. |
| 9,097,084 B2 | 8/2015 | McDougall et al. |
| 9,776,284 B2 | 10/2017 | Hu et al. |
| 10,022,820 B2 | 7/2018 | Gaebelein et al. |
| 2002/0007209 A1 * | 1/2002 | Scheerder ............... A61F 2/915 623/1.15 |
| 2002/0087120 A1 | 7/2002 | Rogers et al. |
| 2002/0148216 A1 | 10/2002 | Brault et al. |
| 2005/0159789 A1 | 7/2005 | Brockway et al. |
| 2005/0187509 A1 | 8/2005 | Wolf |
| 2006/0042256 A1 | 3/2006 | Storey |
| 2007/0137213 A1 | 6/2007 | Rickert et al. |
| 2007/0241931 A1 | 10/2007 | Compton et al. |
| 2007/0266705 A1 | 11/2007 | Wood et al. |
| 2007/0278195 A1 | 12/2007 | Richerzhagen et al. |
| 2008/0095652 A1 | 4/2008 | Jiang |
| 2008/0112798 A1 | 5/2008 | Seitzer et al. |
| 2008/0269573 A1 | 10/2008 | Najafi et al. |
| 2009/0005656 A1 | 1/2009 | Najafi |
| 2009/0148273 A1 | 6/2009 | Suciu et al. |
| 2009/0151996 A1 * | 6/2009 | Mishima ............... B23K 26/18 174/262 |
| 2009/0183511 A1 | 7/2009 | Dinu |
| 2009/0243855 A1 | 10/2009 | Prokopuk |
| 2011/0088405 A1 | 4/2011 | Turco |
| 2012/0039702 A1 | 2/2012 | Sharp |
| 2013/0000315 A1 | 1/2013 | Mowill |
| 2013/0046152 A1 | 2/2013 | Najafi et al. |
| 2013/0152582 A1 | 6/2013 | Anschel et al. |
| 2013/0164157 A1 | 6/2013 | Roberts et al. |
| 2013/0330168 A1 | 12/2013 | Liotta et al. |
| 2014/0075755 A1 | 3/2014 | Hu et al. |
| 2014/0216051 A1 | 8/2014 | Johnson et al. |
| 2014/0127110 A1 | 9/2014 | Davis, III et al. |
| 2014/0255145 A1 | 9/2014 | Miranda et al. |
| 2015/0000939 A1 | 1/2015 | Willner |
| 2015/0013345 A1 | 1/2015 | Porter et al. |
| 2015/0037140 A1 | 2/2015 | Biyani et al. |
| 2015/0165553 A1 | 6/2015 | Gaebelein et al. |
| 2015/0165559 A1 | 6/2015 | Gaebelein et al. |
| 2017/0252865 A1 | 9/2017 | Hu et al. |

FOREIGN PATENT DOCUMENTS

| | | |
|---|---|---|
| EP | 1189805 A1 | 3/2002 |
| EP | 1832751 A1 | 9/2007 |
| EP | 1833636 B1 | 7/2010 |
| EP | 1770331 A3 | 9/2014 |
| WO | 8602406 A1 | 4/1986 |
| WO | 910439 A2 | 4/1991 |
| WO | 9727923 A1 | 8/1997 |
| WO | 2001002242 A1 | 1/2001 |
| WO | 2006060010 A1 | 6/2006 |
| WO | 2007013293 A1 | 2/2007 |
| WO | 2008127845 A1 | 10/2008 |
| WO | 2009006249 A1 | 1/2009 |
| WO | 2010072998 A1 | 7/2010 |
| WO | 2012030776 A2 | 3/2012 |
| WO | 2013001361 A2 | 1/2013 |
| WO | 2014099330 A1 | 6/2014 |
| WO | 2014178731 A2 | 11/2014 |

* cited by examiner

PROTECTIVE SHIELD FOR LIQUID GUIDED LASER CUTTING TOOLS

BACKGROUND

The disclosure relates generally to liquid guided laser cutting tools, and more particularly, to protective shields for the discharge nozzle of liquid guided laser cutting tools.

Industrial cutting tools combining a high energy laser beam with a focused jet of transparent liquid, such as water, have been in use for a number of years. These systems generally comprise a laser and a beam guide providing the laser beam, an optics module for controllably focusing the laser, a coupling assembly for coupling the laser with a high pressure liquid jet, and a discharge nozzle.

Additional protective features have been added to liquid guided laser cutting tools to protect the integrity of the liquid jet and beam path, as well as to prevent wear or other damage to the nozzle and/or upstream components in the system. These risks are created be several factors, such as feedback from the workpiece created by surface waves or vibration, accidental contact with the workpiece or projections related thereto, suction of particles of ablated material from the workpiece, reflected laser and plasma light, and/or deflected liquid. Certain applications may suggest increased need for protective features.

Some systems employ a nozzle cover or cap that creates a space adjacent the nozzle and serves as a mounting for a thin, replaceable shield. However, additional improvements that enhance reliability of water jet flow, extend the distance between the workpiece and the discharge nozzle (while maintaining effective cutting), last longer, are easier to use, and/or better protect the system are desirable.

SUMMARY

A first aspect of this disclosure provides a shield for use in a liquid guided laser system. The shield comprises a rigid body with a target facing surface. The rigid body defines a through hole with a diameter that accommodates a liquid guided laser path. The rigid body has a thickness that defines a length of the liquid guided laser path through the rigid body. The thickness of the rigid body is at least twice the diameter of the through hole. The rigid body is positioned in the liquid guided laser path of the liquid guided laser system between a discharge nozzle of the liquid guided laser system and a target.

A second aspect of the disclosure provides a method of using a shield in a liquid guided laser system. The method comprises positioning the shield, which comprises a rigid body with a target facing surface, in a liquid guided laser path of the liquid guided laser system between the discharge nozzle of the liquid guided laser system and a target. The rigid body defines a through hole with a diameter that accommodates a liquid guided laser path. The rigid body has a thickness that defines a length of the liquid guided laser path through the rigid body. The thickness of the rigid body is at least twice the diameter of the through hole. The shield protects the liquid guided laser path during operation of the liquid guided laser system and deflects materials from the target facing surface.

A third aspect of the disclosure provides a system using the shield. The system comprises a liquid guided laser system with a discharge nozzle defining a liquid guided laser path and capable of generating a liquid guided laser beam along the liquid guided laser path. It also comprises a shield comprising a rigid body with a target facing surface. The rigid body defines a through hole with a diameter that accommodates the liquid guided laser path. The rigid body has a thickness that defines a length of the liquid guided laser path through the rigid body. The thickness of the rigid body is at least twice the diameter of the through hole. The rigid body is positioned in the liquid guided laser path of the liquid guided laser system between the discharge nozzle of the liquid guided laser system and a target.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a protective shield (and related systems and methods) for use in a liquid guided laser cutting tool. An improved protective shield may extend the distance between the discharge nozzle of the coupling device and the target workpiece, placing a rigid protective barrier along the liquid guided laser path that both protects the coupling device and other upstream components and preserves the integrity of the liquid guided laser beam over the longer distance between the discharge nozzle and the workpiece. The shield is positioned in the liquid guided laser path between the discharge nozzle and the workpiece. The shield includes a through hole for the liquid guided laser path and the shield material may be non-reflective to minimize interference with the laser beam. The thickness of the rigid protective shield may protect the liquid guided laser path from disruption, including reflected laser and plasma light, and increase the durability and useful life of the shield for protecting upstream components from liberated materials such as particles of ablated material from the workpiece and/or deflected liquid.

Figure 1:
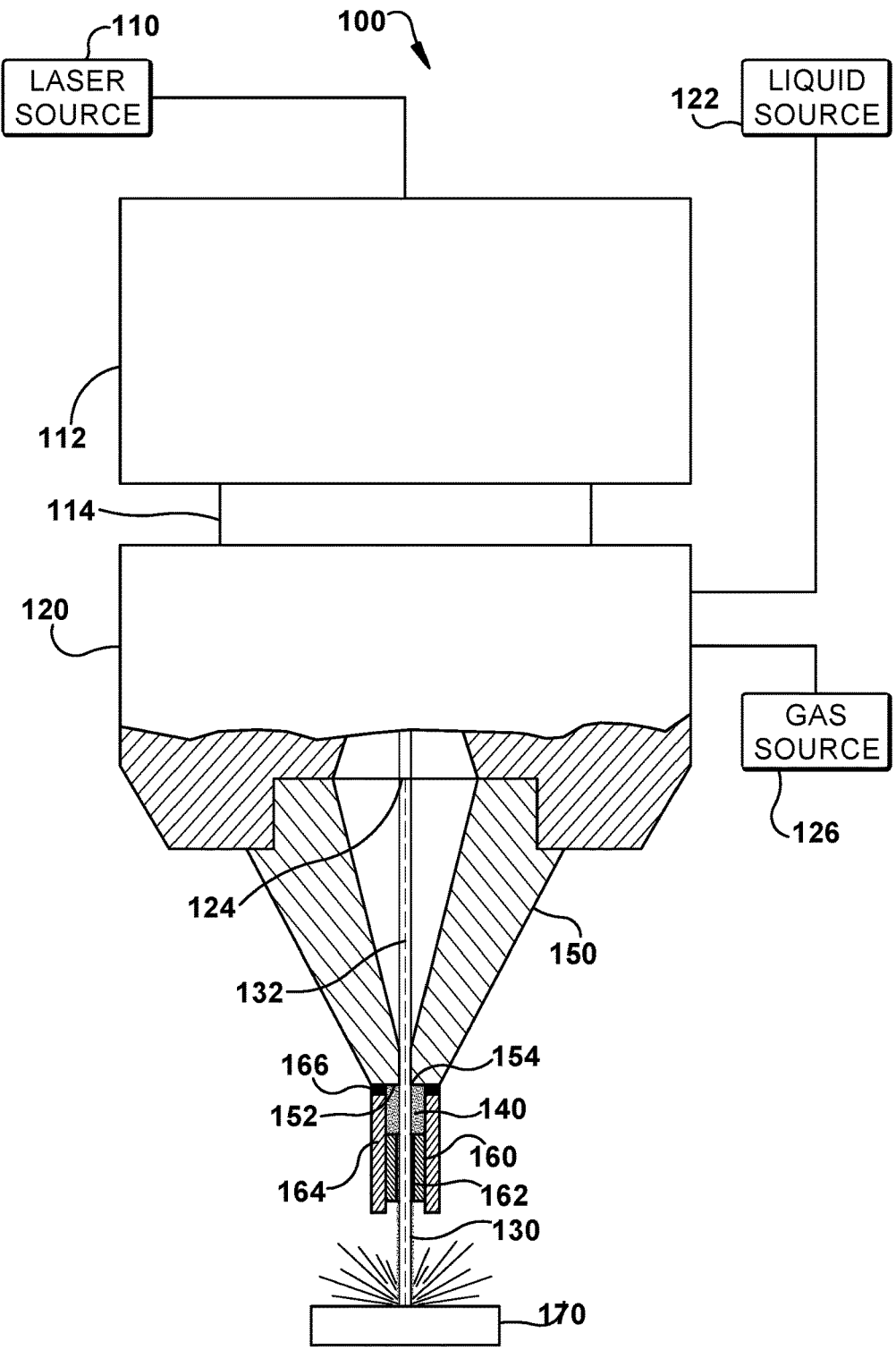
FIG. 1 shows block diagram with a cross-sectional view an example system using a shield.

FIG. 1 shows an example liquid guided laser cutting tool system 100. A laser source 110 is coupled to a laser optics module 112 that uses optical components to focus the laser into a beam. The laser optics module 112 directs the laser beam into a coupling assembly 120. A lateral positioning assembly 114 may be provided between the laser optics module 112 and the coupling assembly 120 to assist in lateral positioning of the laser beam. The coupling assembly 120 receives liquid, such as water, from a liquid source 122 and forces the liquid into a liquid jet through which the laser beam can be directed, creating a liquid guided laser beam 130. The liquid guided laser beam 130 emerges from a discharge nozzle 124 on the bottom of the coupling assembly 120 facing a target 170 and follows a liquid guided laser path 132 from the discharge nozzle 124 to the target 170. The coupling assembly 120 may also receive a protective gas 140 from a gas source 126 and discharge the protective gas 140 adjacent the liquid guided laser path 132. In some embodiments, a protective layer of the protective gas 140 surrounds the liquid guided laser beam 130 along a substantial portion of the liquid guided laser path 132.

The system 100 may also include a nozzle cap 150. The nozzle cap 150 surrounds and protects the liquid guided laser beam 130 and extends the distance from the discharge nozzle 124 of the coupling assembly 120 to the target 170. The nozzle cap 150 may further serve to direct the protective gas 140 adjacent the liquid guided laser path 132. The nozzle cap 150 may include a tip surface 152 and a beam opening 154 for allowing the liquid guided laser beam 130 to pass out of the nozzle cap 150 toward the target 170. The nozzle cap 150 may also include one or more gas ports (not shown) for allowing the protective gas 140 to flow from the nozzle cap 150 and surround the liquid guided laser beam 130.

The system 100 further includes a shield 160 that protects the liquid guided laser beam 130 as it approaches the target 170 and prevents beam disruption and debris getting back to other components of the system 100. The shield 160 is positioned in the liquid guided laser path 132, such that the liquid guided laser beam 130 passes through a through hole 162 defined by the shield 160. In the example shown, the through hole 162 is of sufficient size that both the liquid guided laser beam 130 and a surrounding barrier of protective gas 140 may bass through the shield 130. In the example shown, the position of the shield 160 is maintained by a shield housing 164 that is removably attached to the tip surface 152 of the nozzle cap 150 by an attachment assembly 166. Example shields and configurations for maintaining the shield position relative to the liquid guided laser beam are described below in greater detail with regard to FIGS. 2-9.

Figure 2:
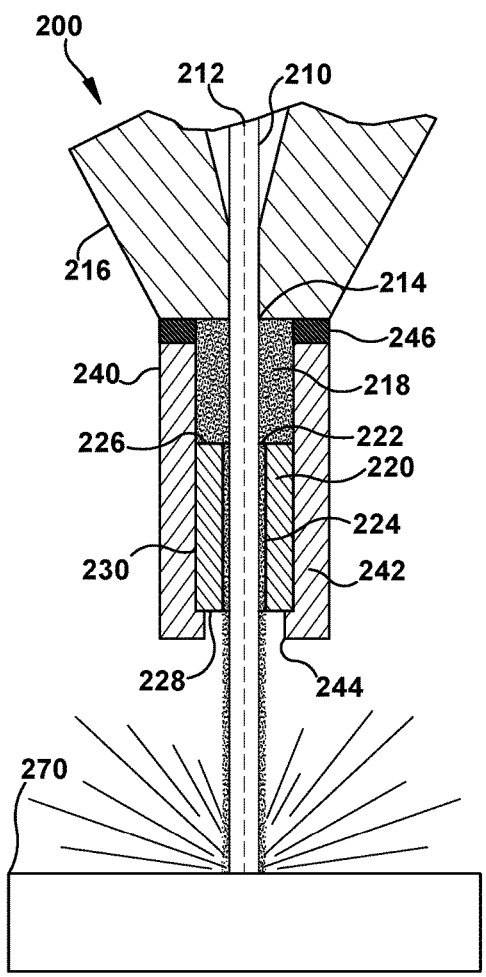
FIG. 2 shows a close-up cross-sectional view of an example shield and housing attached to a system.

FIG. 2 shows a close-up view of a portion 200 of a liquid guided laser system, such as the liquid guided laser cutting tool system 100 of FIG. 1. A liquid guided laser beam 210 follows a liquid guided laser path 212 through a beam opening 214 of a component 216, such as the top of a nozzle cap or the discharge nozzle of a coupling assembly. In the example shown, a protective gas 218 is also present in the vicinity of the beam opening 214 and surrounding the liquid guided laser beam 210. A shield 220 is positioned in the liquid guided laser path 212 and has a through hole 222 through which the liquid guided laser beam 210 passes. In the example shown, the through hole 222 is sized to allow a layer of protective gas 218 to flow around the liquid guided laser beam 210, between the interior surface 224 of the through hole 222 and the liquid guided laser beam 210. The shield 220 has a component facing surface 226, a target facing surface 228, and a lateral surface 230. The shield is held in position relative to the liquid guided laser path by a shield housing 240. The shield housing 240 includes side wall 242 removably engaged to the lateral surface 230 of the shield 220. The side wall 242 includes a retaining shelf 244 that assists in retaining the shield 220 in the shield housing 240. The shield housing 240 also includes a connector 246 that removably attaches the shield housing 240 to the component 216. For example, the connector 246 could be a removable adhesive or a mechanical connector that engages with a connecting feature (not shown) of the component 216. The shield housing 240 may accommodate a plurality of shield thicknesses, as well as provide space above the shield 220 for accommodating a reservoir of protective gas 218. The liquid guided laser beam 210 is shown ablating the surface of the target 270 and the target facing surface 228 of the shield 220 providing a protective barrier to ablated materials and reflected liquid.

Figure 3:
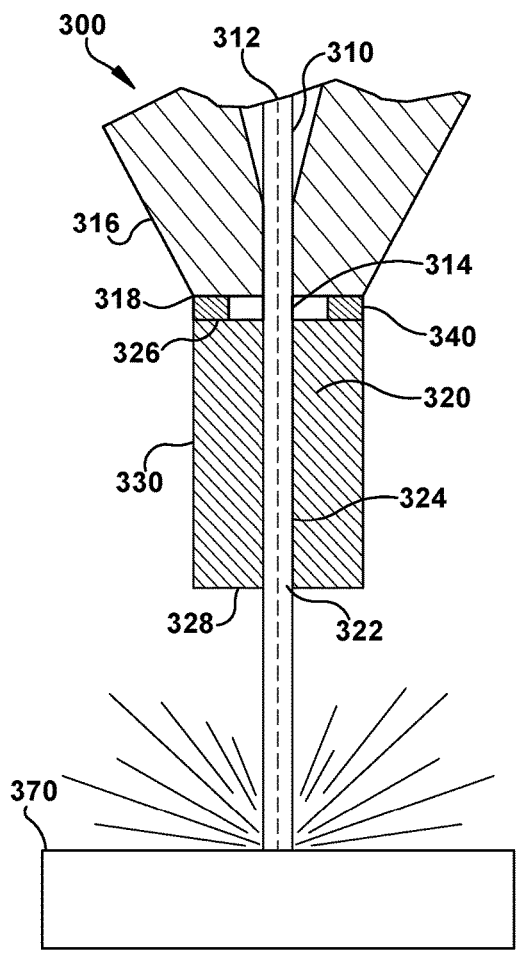
FIG. 3 shows a close-up cross-sectional view of another example shield attached to a system.

FIG. 3 shows a close-up view of a portion 300 of a liquid guided laser system, using an alternate configuration for positioning the shield 320. A liquid guided laser beam 310 follows a liquid guided laser path 312 through a beam opening 314 of a component 316, such as the end of a nozzle cap or the discharge nozzle of a coupling assembly. The shield 320 is positioned in the liquid guided laser path 312 and has a through hole 322 defined by an interior surface 324 and through which the liquid guided laser beam 310 passes. The shield 320 has a component facing surface 326, a target facing surface 328, and a lateral surface 330. In this configuration, the shield 320 is directly and removably attached to the component 316 at an attachment surface 318 using a connector 340. For example, the connector 340 could be a removable adhesive or a mechanical connector that engages with a connecting feature (not shown) on the attachment surface 318 of the component 316. In one embodiment, a connecting feature (not shown) is incorporated into the component facing surface 326 of the shield 320 and a compatible connecting feature (not shown) is incorporated into the attachment surface 318 of the component 316, such as threaded or seated connecting features. The liquid guided laser beam 310 is shown ablating the surface of the target 370 and the target facing surface 328 of the shield 320 providing a protective barrier to ablated materials and reflected liquid.

Figure 4:
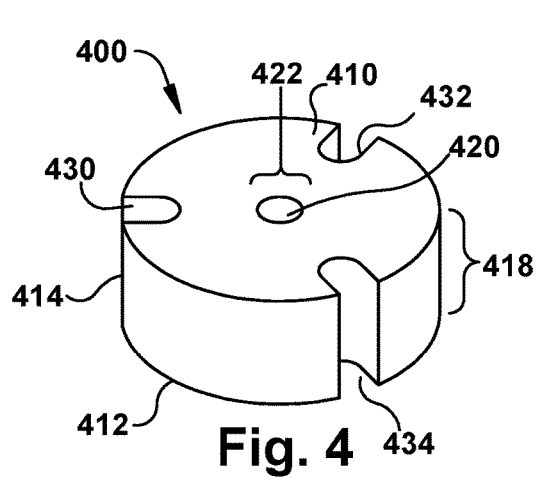
FIG. 4 shows a perspective view of an example shield.
Figure 5:
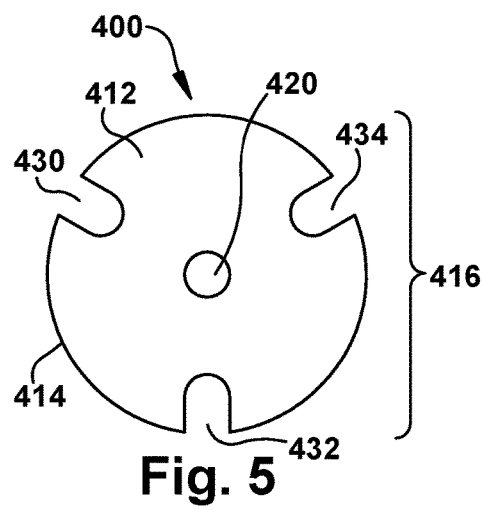
FIG. 5 shows a bottom view of the example shield of FIG. 1.

FIGS. 4 and 5 show a perspective view and a bottom view of an example shield 400. The shield 400 is comprised of a rigid body in the shape of a cylinder with various negative features defined therein. The shield 400 includes a top or nozzle facing surface 410 and a bottom or target facing surface 412. The shield 400 also includes a side wall surface 414. In some embodiments, the side wall surface 414 acts as an attachment surface, such as when using a housing to maintain the position of the shield 400, where the housing circumferentially engages the side wall surface 410. In other embodiments, a portion of the nozzle facing surface 410 or the target facing surface 412 may provide attachment surfaces alone or in combination with each other and/or the side wall surface 414. The cylinder of the shield 400 has a diameter 416 and a height 418. The height 418 of the shield 400 may also be referred to as the thickness of the shield 400. In some embodiments, the height 418 of the shield 400 will be at least 0.050".

The shield 400 defines a through hole 420. The through hole 420 has a diameter 422. The through hole 420 is positioned in the liquid guided laser path of the liquid guided laser system when in use. In some embodiments, the shield 400 is positioned such that the center of the through hole 420 is aligned with the center of the liquid guided laser path. The diameter 422 of the through hole 420 is greater than the diameter of the liquid guided laser beam (including both the laser beam and the column of the liquid jet) for which it is designed. In some embodiments, the diameter 422 of the through hole 420 is greater than the diameter of the liquid guided laser beam such that there is sufficient space on all sides of the liquid guided laser beam to allow the flow of a reasonable protective gas layer, without creating such a large space that it is difficult to retain the protective gas or the through hole becomes so large that its effectiveness in preventing disruption of the liquid guided laser beam is substantially decreased. In some embodiments, the diameter 422 will be at least 0.020". The length of the liquid guided laser path through the through hole 420 of the shield 400 is equal to the thickness or height 418 of the shield 400.

In some embodiments, the physical dimensions of the shield 400 are defined in terms of the diameter 422 of the through hole 420, which is in turn defined by the range of diameters of the liquid guided laser beam that the shield 400 is intended to work with. The thickness or height 418 of the shield 400 is generally at least twice the diameter 422 of the through hole 420, or at least a 2:1 ratio. In the example shield shown, the height 418 is approximately three times the diameter 422 of the through hole 420, or a 3:1 ratio. In some embodiment, thicknesses of up to a 10:1 ratio may be used and even greater ratios of thickness to through hole diameter may be possible. In one embodiment, the height 418 of the shield 400 is approximately 0.1" with the diameter 422 of the through hole 420 approximately 0.02" for a 5:1 ratio. In an alternate embodiment, the height 418 of the shield 400 is approximately 0.160" and the diameter 422 of the through hole 420 is approximately 0.040" for a 4:1 ratio. Note that it may be preferable to produce a plurality of shields with different through hole diameters while maintaining a consistent thickness, creating variations in the thickness to through hole ratio, but they may all stay in a reasonable range.

In some embodiments, the diameter 416 of the shield 400 is defined by the attachment mechanism for positioning the shield in the liquid guided laser path, such as a housing, carrier, or other mounting intended to accommodate and engage the side wall surface 414. The diameter 416 of the shield 400 may still be expressed in terms of a ratio to the diameter 422 of the through hole 420, though multiple shields with differing diameters for their through holes may have the same shield diameter to be compatible with a common attachment mechanism. This may create variation within the ratios of the diameter of the through hole to the diameter of the shield, though they would generally fall within a common range. The ratio of the shield diameter to the through hole diameter is generally at least 3:1. In the example shield 400, the ratio of the diameter 416 of the shield 400 to the diameter 422 of the through hole 420 is approximately 8:1.

The shield 400 may further define one or more drainage features 430, 432, 434. Drainage features may generally be used in embodiments where the shield 400 is positioned in the liquid guided laser system as a shield blank and the liquid guided laser beam is used to produce the through hole 420. The purpose of the drainage features may be to reduce the fluid and ablated material that might otherwise become trapped between the top surface 410 of the shield 400 and the nearest component of the liquid guided laser system until the through hole 420 is complete. The number, size, and shape of the drainage features may be varied without substantially changing function of the shield 400. Depending on whether the shield 400 is disposed in a housing, the connectors and shield surfaces used for connection, along with the thickness and shape of the particular shield may impact the arrangement of the drainage features.

Material selection for the shield 100 is relevant to its rigidity and other protective features. In some embodiments, the rigid body of the shield 100 is formed from a single piece of uniform material. Shield materials may be selected for their rigidity and resistance to mechanical wear. Some example materials may include tungsten carbide, boron nitride, and ceramic matrix composites. Shield materials may generally be selected with a Young's modulus greater than 200 Gpa. In some embodiments, materials with a Young's modulus of 400 or greater may be preferred. In addition to material rigidity, materials having low reflectivity may also be desirable to reduce reflection and reduce interference with the liquid guided laser beam. For example, tungsten carbide, boron nitride, and some ceramic matrix composites are substantially non-reflective and appear black. The reflectivity may be most important adjacent the beam path through the shield 400. Therefore, the material adjacent the through hole and the top and bottom surfaces near the through hole may be preferably non-reflective, while other surfaces of the shield 400 may not have the same requirements.

Figure 6:
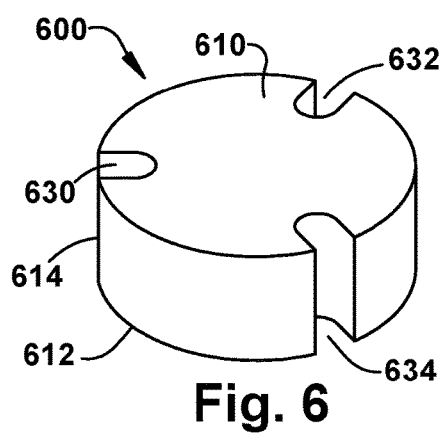
FIG. 6 shows a perspective view of an example shield blank.
Figure 7:
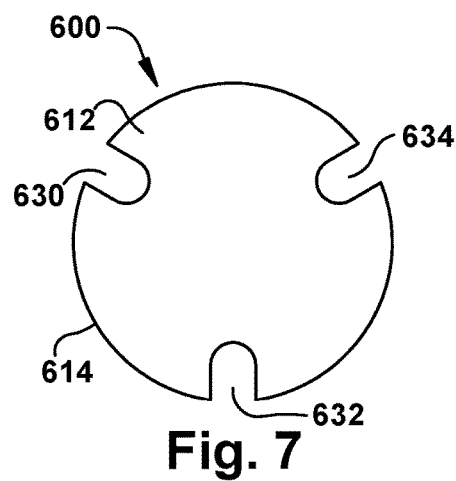
FIG. 7 shows a bottom view of the example shield blank of FIG. 3.

FIGS. 6 and 7 show an example shield blank 600, such as could be used to make shield 400 in FIGS. 4 and 5 above. In the example shown, shield blank 600 has substantially identical features to shield 400, including a top surface 610, a bottom surface 612, a lateral surface 614, and drainage features 630, 632, 634. However, the shield blank 600 lacks a through hole, through which the liquid guided laser beam could pass. Rather than machining a through hole in the shield blank 600 prior to installation in the liquid guided laser system, the through hole is made in the shield blank using the liquid guided laser beam. This process may simplify alignment of the through hole with the liquid guided laser path.

Figure 8:
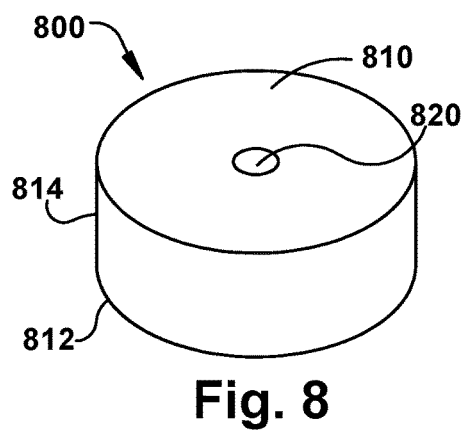
FIG. 8 shows a perspective view of another example shield.
Figure 9:
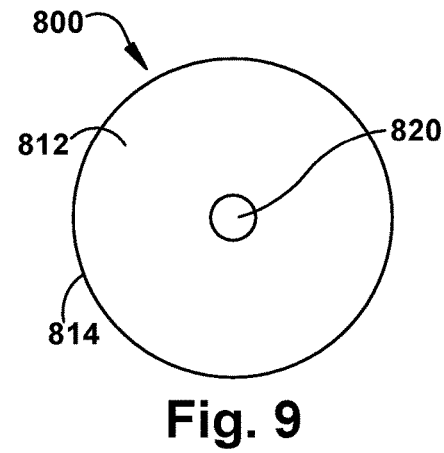
FIG. 9 shows a bottom view of the example shield of FIG. 5.

FIGS. 8 and 9 another example shield 800, in which the through hole 820 has been machined prior to installation and positioning in the liquid guided laser system. The shield 800 may be designed substantially similar to the shield 400 above, including a top surface 810, a bottom surface 812, a lateral surface 814, and a through hole 820. An advantage of pre-drilling the through hole 820 may be elimination of drainage features.

Figure 10:
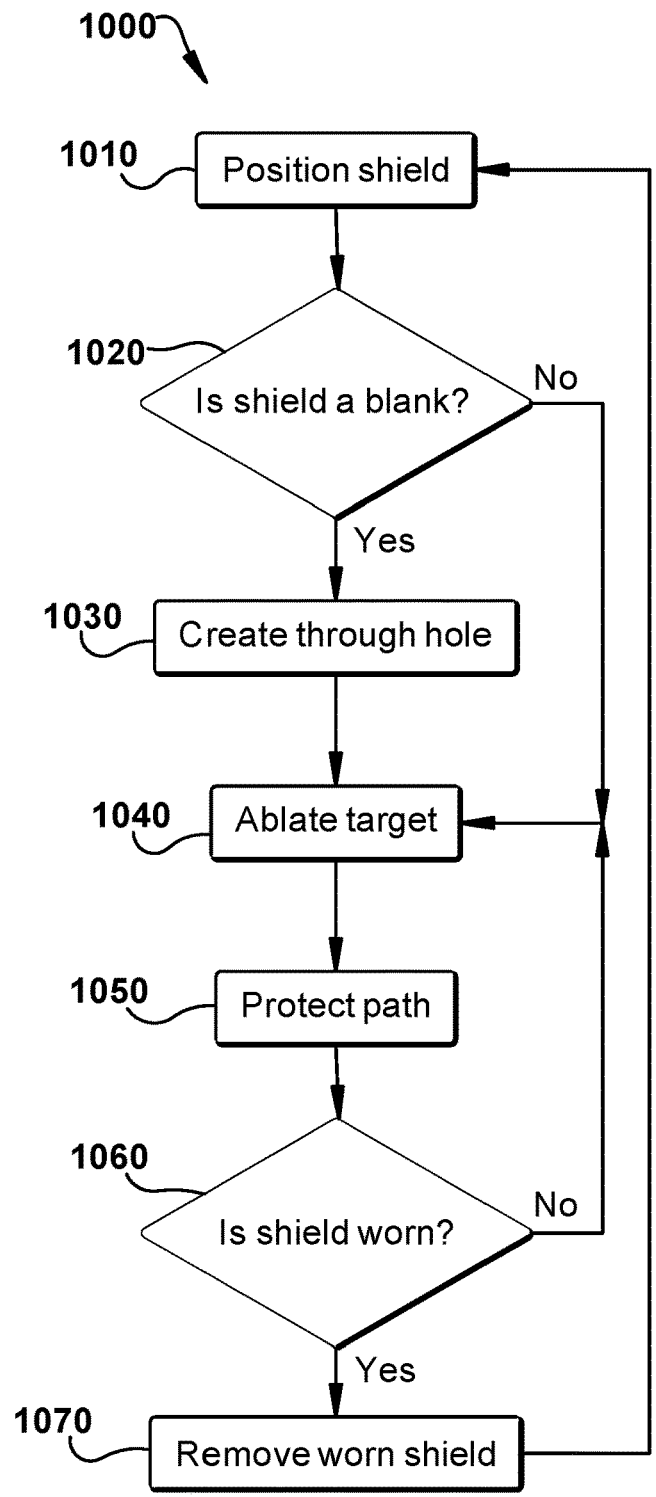
FIG. 10 shows an example method of using a shield.

FIG. 10 shows an example method 1000 of using a shield in a liquid guided laser system, such as the shields and systems described with regard to FIGS. 1-9 above. In step 1010, the shield is positioned relative to the liquid guided laser path of the liquid guided laser system, with a top surface that faces the other components of the system and a bottom surface that faces the target or work piece. For example, the shield may be attached to a nozzle cap or near the discharge nozzle of a coupling assembly, with or without a shield housing. In step 1020, the shield is evaluated to determine whether it has a through hole and is ready to use or is a shield blank in need of a through hole. If it is not a shield blank and has a ready-to-use through hole, the method proceeds to step 1040. If it is a shield blank and does not have a functional through hole, the method proceeds to step 1030. In step 1030, a through hole is created in the shield blank to make it a functional shield. For example, the liquid guided laser beam may be used to ablate the shield material along the liquid guided laser beam path until a through hole is created. With a functional through hole allowing uninterrupted passage of the liquid guided laser beam from the discharge nozzle to the target, the method proceeds to step 1040. In step 1040, the target is ablated by the liquid guided laser beam in accordance with the intended operation of the liquid guided laser system. The ablation of the target creates debris and reflected liquid and interference. In step 1050, the shield operates to protect the liquid guided laser path through the shield, as well as protecting the path, beam integrity, and other system components above the shield along the beam path. Undesired materials are deflected by the target facing surface of the shield and the combination of the liquid guided laser beam, limited diameter of the through hole, and relatively long path length through the thickness of the shield further prevents materials from penetrating into the upper components. In step 1060, the shield is checked for wear. If the shield is worn beyond a desired state, the worn shield may be removed in step 1070 and replaced by returning to step 1010. Otherwise, operation of the liquid guided laser system may continue by returning to step 1040.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A shield comprising:
    a rigid body with a target facing surface;
    wherein the rigid body defines a through hole with a diameter that accommodates a liquid guided laser path and the rigid body has a thickness that defines a length of the liquid guided laser path through the rigid body;
    wherein the thickness of the rigid body is at least twice the diameter of the through hole;
    whereby the rigid body is positioned in the liquid guided laser path of a liquid guided laser system between a discharge nozzle of the liquid guided laser system and a target; and
    wherein the shield is removably connected to a nozzle cap that separates the shield from the discharge nozzle of the liquid guided laser system while maintaining the position of the shield relative to the liquid guided laser path.

2. The shield of claim 1, wherein the rigid body is comprised of a material having a Young's modulus greater than 200 Gpa.

3. The shield of claim 2, wherein the rigid body is comprised of materials selected from tungsten carbide, boron nitride, and ceramic matrix composites.

4. The shield of claim 1, wherein the rigid body is substantially non-reflective adjacent the liquid guided laser path.

5. The shield of claim 4, wherein the rigid body is substantially non-reflective on all surfaces.

6. The shield of claim 1, wherein the ratio between the thickness of the rigid body and the diameter of the through hole is in the range of 2:1 to 10:1.

7. The shield of claim 1, wherein the rigid body is a cylinder, the thickness of the rigid body is a height of the cylinder, and a diameter of the cylinder is at least three times the diameter of the through hole.

8. The shield of claim 1, wherein the shield is disposed in a shield housing and the shield housing is connected to the nozzle cap.

9. The shield of claim 1, wherein the diameter of the through hole is larger than a diameter of a liquid guided laser beam in the liquid guided laser path and accommodates passage of a protective gas layer adjacent the liquid guided laser beam through the through hole.

10. The shield of claim 1, wherein the rigid body further defines at least one drainage feature that is not the through hole for the liquid guided laser path.

11. The shield of claim 1, wherein the shield is initially positioned in the liquid guided laser path of a liquid guided laser system as a blank without the through hole and the liquid guided laser system uses a liquid guided laser beam to create the through hole in the liquid guided laser path.

12. A system comprising:
    a liquid guided laser system with a discharge nozzle defining a liquid guided laser path and capable of generating a liquid guided laser beam along the liquid guided laser path;
    a shield comprising a rigid body with a target facing surface, wherein the rigid body defines a through hole with a diameter that accommodates the liquid guided laser path and the rigid body has a thickness that defines a length of the liquid guided laser path through the rigid body, wherein the thickness of the rigid body is at least twice the diameter of the through hole, and whereby the rigid body is positioned in the liquid guided laser path of the liquid guided laser system between the discharge nozzle of the liquid guided laser system and a target; and
    a nozzle cap positioned between the discharge nozzle of the liquid guided laser system and the shield and wherein the shield is attached to the nozzle cap, with the position of the shield relative to the liquid guided laser path being maintained.

\* \* \* \* \*